US011859437B2

(12) United States Patent
Poundstone

(10) Patent No.: US 11,859,437 B2
(45) Date of Patent: Jan. 2, 2024

(54) WINDOW ATTACHMENT SYSTEM AND METHOD

(71) Applicant: Seth Poundstone, Lakeville, MN (US)

(72) Inventor: Seth Poundstone, Lakeville, MN (US)

( * ) Notice: Subject to any disclaimer, the term of this patent is extended or adjusted under 35 U.S.C. 154(b) by 0 days.

(21) Appl. No.: 17/560,803

(22) Filed: Dec. 23, 2021

(65) Prior Publication Data

US 2023/0066048 A1 Mar. 2, 2023

Related U.S. Application Data

(63) Continuation of application No. 17/460,796, filed on Aug. 30, 2021.

(51) Int. Cl.

| | |
|---|---|
| ***E06B 1/36*** | (2006.01) |
| ***E06B 3/26*** | (2006.01) |
| ***E06B 3/263*** | (2006.01) |
| ***E06B 1/60*** | (2006.01) |

(52) U.S. Cl.

CPC .............. *E06B 1/36* (2013.01); *E06B 1/6007* (2013.01); *E06B 3/26* (2013.01); *E06B 3/263* (2013.01); *E06B 1/6053* (2013.01)

(58) Field of Classification Search

CPC . E06B 1/003; E06B 1/006; E06B 1/02; E06B 1/04; E06B 1/60; E06B 1/56; E06B 1/58; E06B 1/36; E06B 1/6007; E06B 3/26; E06B 3/263

See application file for complete search history.

(56) References Cited

U.S. PATENT DOCUMENTS

| | | | | | |
|---|---|---|---|---|---|
| 4,694,612 | A * | 9/1987 | Pruden | E06B 3/44 | 49/504 |
| 4,831,781 | A * | 5/1989 | Morton | E06B 3/5063 | 49/458 |
| 5,099,624 | A * | 3/1992 | Valentin | E06B 1/366 | 49/404 |
| 5,555,684 | A * | 9/1996 | Galowitz | E06B 1/68 | 52/762 |
| 5,557,894 | A * | 9/1996 | Card | E06B 1/6007 | 52/204.51 |
| 5,682,714 | A * | 11/1997 | Ishikuro | E06B 1/36 | 52/204.5 |
| 5,687,519 | A * | 11/1997 | Bruchu | E06B 1/62 | 52/214 |
| 6,223,484 | B1 * | 5/2001 | Minter | E06B 1/6015 | 49/504 |

(Continued)

FOREIGN PATENT DOCUMENTS

| | | | | |
|---|---|---|---|---|
| CA | 2940635 A1 * | 2/2017 | | E06B 1/36 |
| DE | 102017006161 A1 * | 1/2019 | | |

(Continued)

*Primary Examiner* — Phi D A

(74) *Attorney, Agent, or Firm* — Billion & Armitage

(57) ABSTRACT

A window attachment system for attaching a window to an opening in a building includes a male portion and a female portion. One of the male portion and the female portion is attached to one of the outer perimeter of the window frame or the inner perimeter of the opening in the building. The other of the male portion and the female portion is attached to the outer perimeter of the window frame or the inner perimeter of the opening in the building. The male portion is engaged with the female portion when the window is placed into the opening.

20 Claims, 8 Drawing Sheets

(56) References Cited

U.S. PATENT DOCUMENTS

| | | | | |
|---|---|---|---|---|
| 9,932,765 | B1 * | 4/2018 | Kelley | E06B 3/964 |
| 2002/0092248 | A1 * | 7/2002 | Westphal | E06B 1/6007 52/204.5 |
| 2003/0217523 | A1 * | 11/2003 | Budzinski | E06B 1/6007 52/204.5 |
| 2005/0284094 | A1 * | 12/2005 | Long | E06B 1/6007 52/782.1 |
| 2013/0291459 | A1 * | 11/2013 | Frey | E06B 3/5409 52/656.5 |
| 2014/0318051 | A1 * | 10/2014 | Carlson | E06B 3/4618 52/745.16 |
| 2017/0070185 | A1 * | 3/2017 | Ting | E06B 1/00 |
| 2021/0396069 | A1 * | 12/2021 | Vansickle | E06B 1/36 |
| 2022/0282558 | A1 * | 9/2022 | Header | E06B 1/702 |

FOREIGN PATENT DOCUMENTS

| | | | | |
|---|---|---|---|---|
| GB | 2298446 | A * | 9/1996 | E06B 1/003 |
| KE | 101485125 | B1 * | 10/2013 | |
| KR | 100784982 | B1 * | 10/2007 | |

* cited by examiner

WINDOW ATTACHMENT SYSTEM AND METHOD

CLAIM OF PRIORITY

This application is a continuation of U.S. application Ser. No. 17/460,796, filed on Aug. 30, 2021, which is incorporated by reference in its entirety.

BACKGROUND

Millions of homes exist throughout the world. As of 2019 there were 261.7 million homes in the United States. Additionally, there are all sorts of commercial buildings around the world. The vast majority of these edifices have windows, New homes are built to replace old homes and to meet demand for the latest in housing. Windows in existing homes get old or are obsolete when compared to modern double or triple pane glass windows filled with argon gas.

Replacing windows is rather time consuming. Many years ago, installing windows was much simpler than today. The process included setting the window in the rough opening, leveling the window, square the window, and nail it into place. Setting, leveling and squaring the window included shimming the window. Once nailed, fiberglass insulation was stuffed into spaces between the window and the edge of the rough opening. Then along came expanding spray foam insulation which was sprayed into the spaces. Once that was complete, trim was then placed on the inside and outside of the window.

Presently, still more steps are required. Most of the additional steps are to assure a waterproof installation. Or put another way, to make sure that if water does get behind the siding that it runs away rather than collect around the window and rot the wood. New construction generally features a house wrap which covers or seals small openings in the sheathing and keeps water away from the sheathing material. Many times, sheathing is easily destroyed by water. House wrap keeps water away from the sheathing material. The additional steps include many that occur before the window is set into the opening. Initially, the house wrap is cut and folded back from the window rough opening. It will be trimmed later to cover the nail fin after the window is nailed into place. At the top of the opening, a flap of house wrap is folded up temporarily so that it can later be brought back down to cover a top nail fin and shed water onto the top of the window which of course is designed to shed water away from the window. Once the house wrap is treated, corner flashings are placed corners formed by the bottom portion or sill of the rough opening. Some use flashing tape to treat the corners. Flashing tape is a somewhat heavy rubberized material. Flashing tape is placed below the rough opening and another piece is placed in the sill area. Some installers also taper the sill downwards so that if somehow water would collect there, it would run off. Placing a length of cedar siding is one way to slope the sill. Generally, the opening is heavily caulked to prevent any flow of water between the window and the now prepared rough opening. The window is then placed into the prepared rough opening. Backer rod material is then placed around the sides and top of the window from the interior. The backer rod material is a cylindrical foam that eliminates thermal bridging between the window frame and the shims that will be placed into the rough opening to set the window. The backer rod al so prevents water infiltration.

The jambs are then straightened, and the side shims are placed on the sides of the window. On some windows, side screws are run thought a bracket called a receiver block to further hold the window in place. Foam insulation is placed around the sides and top of the window. A backer rod is placed along the bottom of the window between the side shims. A liberal amount of caulk is placed over the backer rod to form a back dam which serves as a final defense to keep water from getting inside the house. Additional insulation is then placed into the gaps.

Moving outside the house, corner gaskets may be provided for a new window. The corner gaskets are placed at the top corners over the nailing fins. The house wrap is then cut so that it abuts the sides and top of the window and covers the nailing fins. More flashing tape is placed onto the sides of the window over the house wrap. Another strip of house wrap is placed over the top nailing fin and over the side edge of the window. The house wrap above the window is unfolded and brought over the flashing tape. The top flap of house wrap is then covered with seam tape to produce a final seal above the window that will shed water onto the portion of the window designed to shed water.

Described above is a new window installation. Replacing windows will include variations of the above and may include even further steps. This is a very long process with lots of variables any one of which could be missed by your window installer resulting in problems only discoverable many years down the road. This is one way to properly install window waterproofing. There are many variations to the processes that many claim are proper.

SUMMARY

Disclosed is a window attachment system for attaching a window to an opening in a building includes a male portion and a female portion. One of the male portion and the female portion is attached to one of the outer perimeter of the window frame or the inner perimeter of the opening in the building. The other of the male portion and the female portion is attached to the outer perimeter of the window frame or the inner perimeter of the opening in the building. The male portion is engaged with the female portion when the window is placed into the opening in response to applying a sufficient force to the window. The male portion and the female portion are formed continuous. The portion of the window attachment system that is associated with the window frame can be formed integrally with the window at the time of manufacture or can be formed continuously and attached at a later date using adhesives or a fastener. The portion of the window attachment assembly that will be attached to the window opening can also be formed continuously or can be formed in several sections and assembled on site.

The other of the male portion or female portion attached to the inner perimeter of the opening includes an L-shaped base, in one embodiment. The L-shaped base having the other of the male portion or female portion is attached to one leg of the L-shaped base. The other leg is formed to abut an exterior surface of the wall having the opening therein. The other leg also acts to properly space the other of the male portion or the female portion. In another embodiment, the other of the male portion or female portion attached to the inner perimeter of the opening includes a substantially straight base. The other of the male portion or female portion attached to the straight base. The window attachment system can also include a weather proofing material. The weather proofing material covers the male portion in the state where it is engaged with the female portion. In other words, it is in the space between the window and the rough opening of the wall into which the window is installed. The weather proofing material can include one or both of a backer rod and a caulking material.

A window kit includes a window having an outer frame, and one of a male portion or a female portion of an attachment system attached to the frame of the window. The window kit can also include the other of the male portion or the female portion. In one embodiment, the other of the male portion or the female portion is continuous. In another embodiment, the other of the male portion or the female portion is formed of multiple parts. In still a further embodiment, the other of the male portion or the female portion attached to the one of the male portion or the female portion of the window.

A method of attaching a window to an opening in a building includes providing a window frame with one of a male portion or a female portion of a window attachment system, and attaching the other of a male portion or a female portion of a window attachment system to the opening in a building. The window is then positioned to align the male portion and the female portion of the window attachment system. A force sufficient to engage the male portion with the female portion is then aligned to attach the window to the building. The method of attaching a window further includes weatherproofing the gap between the window and the opening in the building.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following pages, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts. In the Detailed Description, reference is made to the accompanying drawings, which form a part hereof, and in which are shown by way of illustration specific embodiments in which the invention may be practiced. It should be understood that other embodiments may be utilized and structural changes may be made without departing from the scope of the present invention. For example, a specific type of window is shown in the Detailed Description and it should be understood that various embodiments of the invention can be used on any type of window, door, or the like that is fitted to an opening in a structure.

Figure 1:
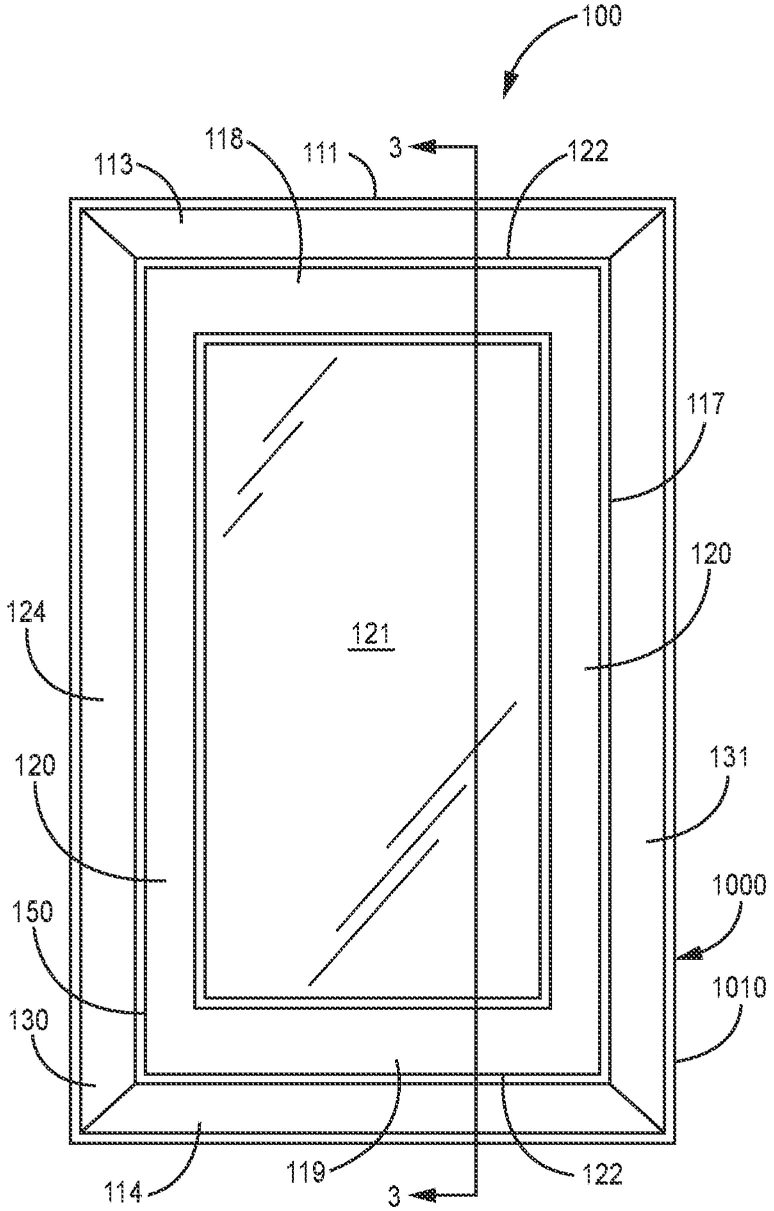
FIG. 1 is an elevational view of an exterior portion of an out-swinging window system, according to an example embodiment.

The various embodiments described here provide many advantages, some of which are mentioned here. The advantages include forming a mechanical barrier to water proofing, easier means for installing windows, doors and the like. The method and apparatus would eliminate a lot of waste in window replacement, reduce or eliminate the need for much of the flashing materials used to install windows today, which leads to less cost and more efficient window replacement or placement in new construction. Adhesive backing on either or both of the male and female components can replace flashing and other water proofing materials, for example. Being able to replace or install windows without the use of a ladder significantly increases the safety of the job site. Window placement would be more uniform when the window attachment system is employed. The exterior of the FIG. 1 is an elevational view of an exterior portion 150 of an out-swinging window system 100 according to one embodiment. The out-swinging window system 100 shown is a casement window. A casement window is one type of out-swinging window system. The casement window shown and described is an example of a window that includes the invention. It should be noted that the invention is not limited to a casement type window and can be used on all windows, doors, sliding doors, and the like. In other words, the invention could be used on anything which is installed into an opening in a building. The casement window units shown in FIG. 1 includes a rectangularly shaped window frame 111 including a (first) vertical frame member 131, a (second) vertical frame member 124, a horizontal upper frame member 113, and a horizontal lower frame member 114. The out-swinging window system 100 includes a casement window sash 117 which includes an upper horizontal member 118, a lower horizontal frame member 119 spaced apart vertical frame members 120 and a transparent glass panel 121. The casement sash 117 is provided with upper and lower track and hinge assemblies 122 which movably mount the case window sash 117 to the window frame 111. The horizontal lower frame member 114 is slanted outwardly, thereby forming a sill 130 on the exterior surface 150 of the casement window or out-swinging window unit 100. It should be noted that the frame members 113, 114, 131 and 124 are also referred to as jambs. Attached to the frame members 113, 114, 131 and 124 is a male portion 1010 of a window attachment system 1000. As will be explained more fully later, the window attachment system 1000 also includes a female portion 1040 which ultimately is attached to the edges of a similarly sized opening in the building for the window system 100. As mentioned earlier, the window attachment system can be used on other types of windows, doors, sliding glass doors or even appliances that are fitted to window-type openings in a house or other type of building.

Figure 2:
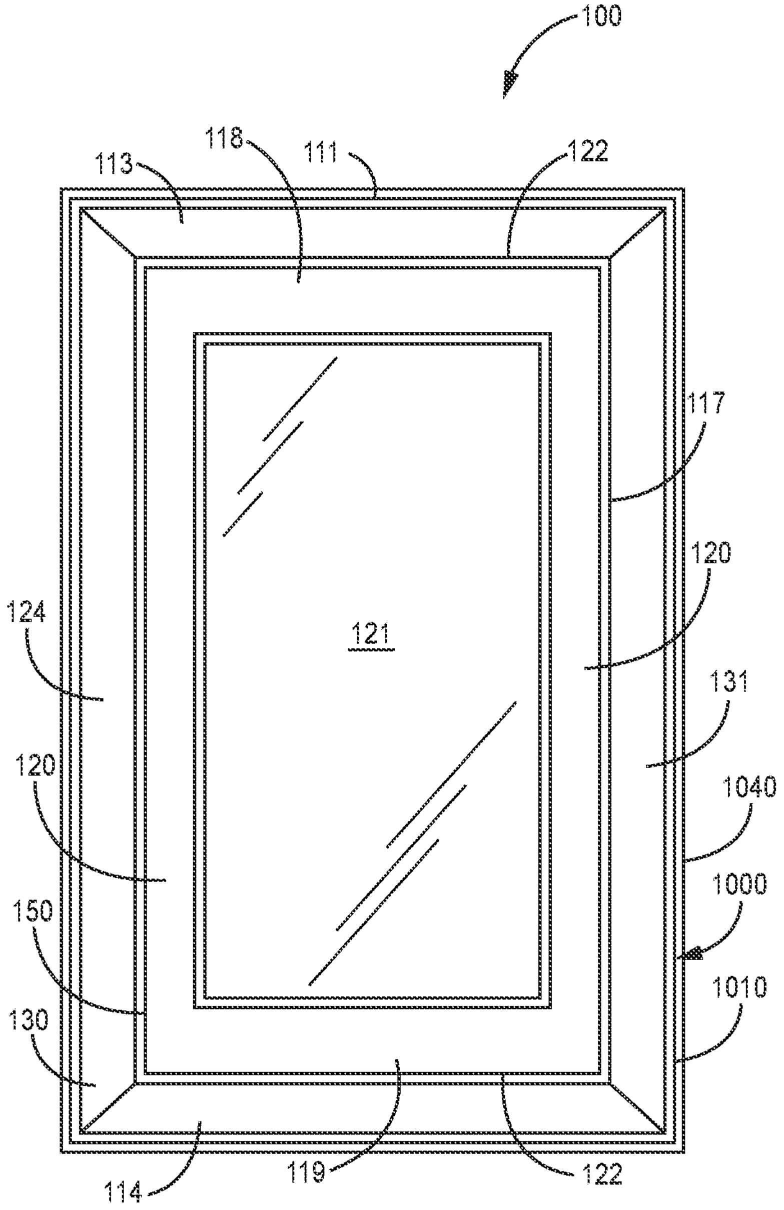
FIG. 2 is an elevational view of an exterior portion of an out-swinging window system with the snap seat installed, according to an example embodiment.

FIG. 2 is an elevational view of an exterior portion of an out-swinging window system with both the male portion 1010 and the female portion 1040 of the window attachment system 1000 placed on the frame members 113, 114, 131 and 124 of the casement window system 100. The male portion 1010 would be permanently attached to the frame members 113, 114, 131 and 124. The female portion 1040 of the window attachment system 1000 is engaged with the male portion 1010. In an alternative embodiment, the male portion and female portions are reversed in the system. The female portion 1040 ultimately is attached to the inside of the opening as installed in a building. Shown in FIG. 2 is one option for packaging of a new casement window system 100 that employs the window attachment system 11000 discussed herein. The female portion 1040 is shipped with the window 100 so that a person installing the new window 100 has both the male portion 1010 and the female portion 1040 when the window is received. Of course, in another embodiment for a new window 100, the window 100 can be shipped as shown in FIG. 1 with only the male portion 1010 attached to the frame members 113, 114, 131 and 124 of the casement window system 100. In this embodiment, the female portion 1040 can be shipped separately or disengaged from the male portion 1010.

Figure 3:
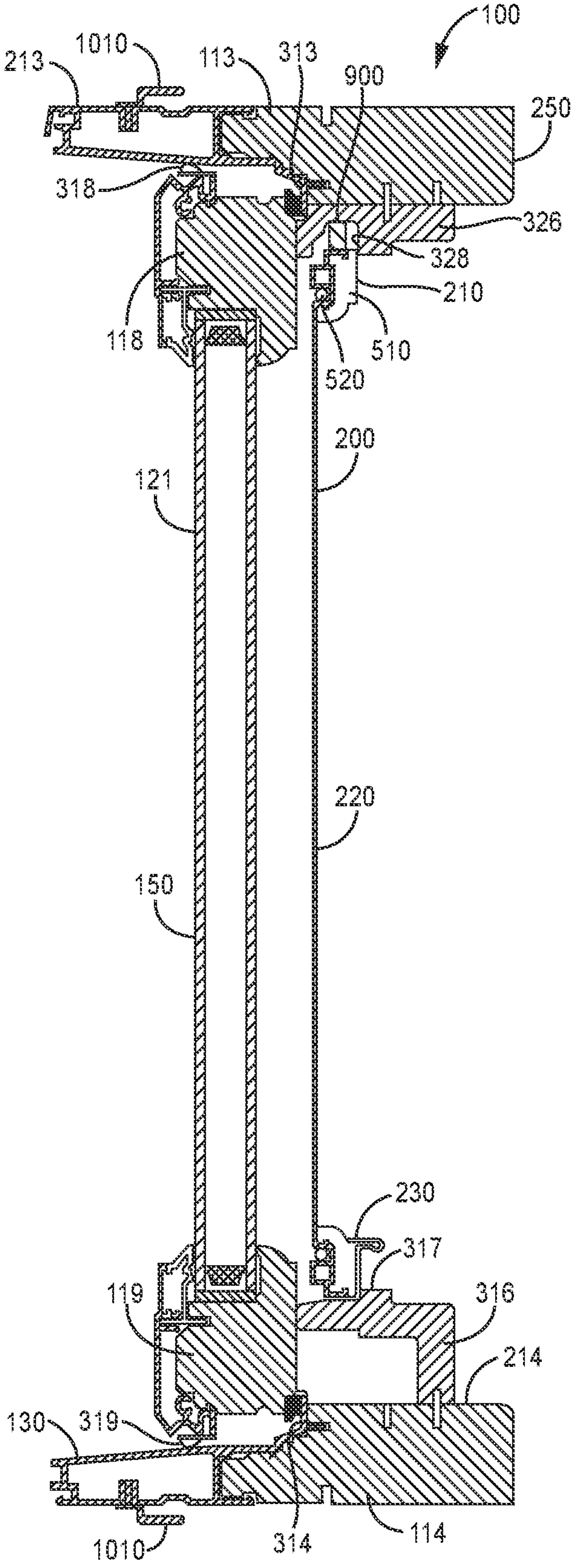
FIG. 3 is a cross-sectional view of the window system shown in FIG. 2 along line 3-3, according to an example embodiment.

FIG. 3 is a cross-sectional view of the window system 100 shown in FIG. 1 along line 3-3. In this particular cross-sectional view, the vertical frame member 124 is not shown for the sake of clarity. As shown in FIG. 3, the window system 100 includes the upper horizontal frame jamb 113 and the lower horizontal frame member 114. The upper horizontal frame member 113 includes a weather seal or rain cap 213. The lower horizontal frame member or jamb 114 includes the exterior sill surface 130 as well as an interior sill surface 214. The window system 100 shows a lower horizontal sash unit 119 and the upper horizontal sash unit 118. Positioned within the sash is a transparent glass panel 121. The transparent glass panel 121 is a double pane, thermal pane type of glass unit in which the pane of glass is actually comprised of two panes of glass which are sealed. It should be noted that a transparent pane of glass can include a single pane of glass, a double pane of glass or triple pane of glass. As shown in FIG. 3, the window system is in a closed position where the sash 118, 119 is brought into engagement with a weather-strip 313 associated with the upper horizontal frame member and a weather-strip 314 associated with the lower horizontal frame member 114. When the sash 118, 119 is engaged with the weather-strip 313, 314, a seal is formed between the frame 113, 114 and the sash 118, 119. Additional seals 318, 319 are used to seal the portion of the sash 118, 119 from weather which would occur at the exterior surface 150 of the window system 100. The male portion 1010 of the window attachment system 1000 is attached to the exterior surface of the window frame. As shown in FIG. 3, the male portion is shown in cross-section at the upper horizontal frame member 113 and at the exterior sill surface 130. The male portion 1010 of the window attachment system 1000 wraps entirely around the exterior surface of the window 100 frame, in one embodiment. In other embodiments, it wraps partially around the exterior surface, such as 75%. It is located at a fixed distance from either the front of window 100 frame or the back of the window 100 frame so that it can engage the female portion 1040 which is located around the interior of a rough opening for the window 100.

As shown in FIG. 3, the lower horizontal frame member 114 or jamb is provided with an essentially L-shaped wood cover 316. The L-shaped wood cover 316 attached to the lower horizontal frame member or jamb 114 can be thought of as an extension of the lower horizontal frame portion or jamb 114. The L-shaped wood cover 316 houses some of the hardware associated with operating the window system 100. The operating hardware is not shown for the sake of clarity. The use of such components eliminates the need for a nail fin or flange for example.

Figure 4:
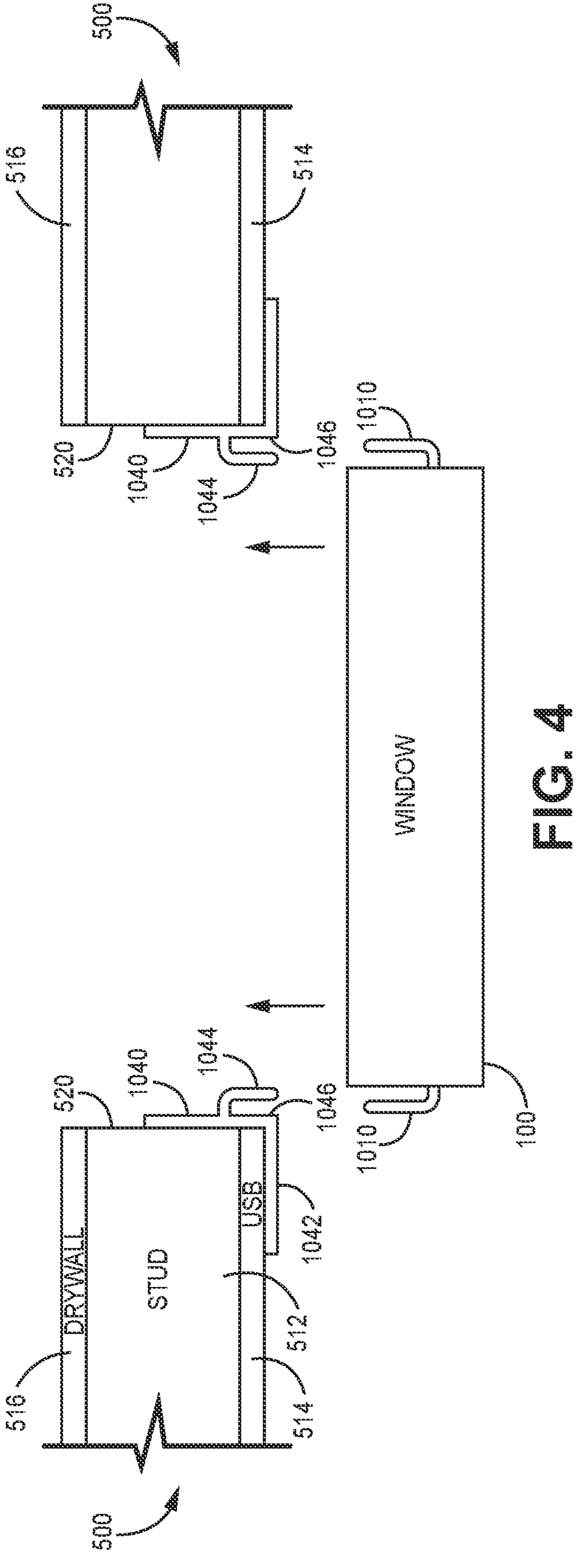
FIG. 4 shows a diagrammatic cross-sectional representation of the window attachment system, according to an example embodiment.

FIG. 4 shows a diagrammatic cross-sectional representation of the window attachment system 100, according to an example embodiment. The window attachment system 100 is for securely attaching a window 100 to a wall 510 of a structure 500, such as a residential home or commercial building or the like. The wall 510 has an opening 520 therein. The opening is many times referred to as a rough opening in the construction trade. Homes and commercial buildings employ balloon construction. The wall is framed from a polarity of studs 512. The studs 512 are provided with sheathing 514 such as oriented strand board ("OSB"). OSB is twice as strong in sheer as plywood. OSB provides rigidity and encloses the wall along the exterior of the wall. The sheathing is covered with cladding (such as siding or the like) later in the construction process. The studs 512 can be made of metal or wood. Metal is generally used in commercial building and wood is generally used for residential building. The wall 500 is insulated, wired and plumbed and then enclosed with a drywall plaster board or drywall 516. A rough opening 520 is generally formed during construction. Once the wall is generally provided with OSB or sheathing 514, the windows 100 are installed to enclose the structure.

The female portion 1040 is placed in the rough opening 520. The female portion 1040 is attached to or integrated with an L-shaped bracket 1042 in the version for new construction which is shown in FIG. 4. The L-shaped bracket 1042 may not be necessary in replacing existing windows, for example. A finger 1044 or other attachment feature is attached to or integrated with the L-shaped bracket 1042 and forms a channel 1046 into which the male portion 1010 connects. The female portion 1040 is placed at the corner of the rough opening and the exterior surface of the wall 500. The female portion 1040 is continuous or substantially continuous around the rough opening 520 which forms a continuous channel 1046 about the rough opening 520. The male portion 1010 is also continuous or substantially continuous around the exterior surface of the window 100. To attach the window 100 into the rough opening 520, the window 100 is placed to the wall 500 at the rough opening 520. The male portion 1010 will then be approximately aligned with the channel 1046. The window is then pressed into place where the male portion 1010 fully or substantially fully engages the channel 1046 of the female portion 1040. The finger 1044 of the female portion is somewhat flexible so as to flex as the male portion 1010 is inserted into the channel 1046. As shown in FIG. 4, the male portion 1010 is monolithic or integral to the window frame. The female portion 1040 could be made of any sufficiently flexible material, such as extruded vinyl or fiberglass, or the like. In another embodiment, the female portion 1040 could be made of C&C aluminum. Similarly, the male portion 1010 can be made of a sufficiently flexible material, such as extruded vinyl or fiberglass, C&C aluminum or the like. As shown, the male portion is on the window 100 frame and the female portion 1040 is on the wall 500 and specifically at the rough opening 520 of the wall 500. It is contemplated that the female portion 1040 could be placed on the window and the male portion could be placed at the rough opening 520 on the wall 500, in another embodiment.

Figure 5:
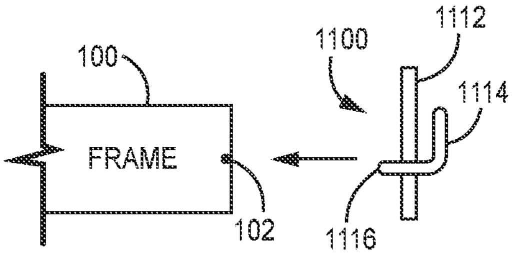
FIG. 5 shows another embodiment of the male portion of the window attachment system as it is attached to the window frame, according to an example embodiment.

FIG. 5 shows another embodiment of a male portion 1110 of the window attachment system 1000 as it is attached to the window 100 frame, according to an example embodiment. In this embodiment, the male portion 1110 includes a substantially straight backer 1112. A male finger 1114 is attached to the backer 1112 on one side of the backer 1112. Attached to the other side of the backer 1112 is a fastener 1116. The fastener 1116 is used to attach the straight backer 1112 to the frame of the window 100. The straight backer 1112 abuts the exterior surface of the window 100 frame. Even though only a portion of the window 100 and the window 100 frame is shown in FIG. 5, it should be understood that the male portion 1110 is attached on all sides of the window 1110 frame. In some embodiments, the window 100 frame can be provided with a groove 102 therein for receiving the fastener 1116 of the alternate male portion 1110. The groove 102 could also be used to correctly position the male portion 1110.

Figure 6:
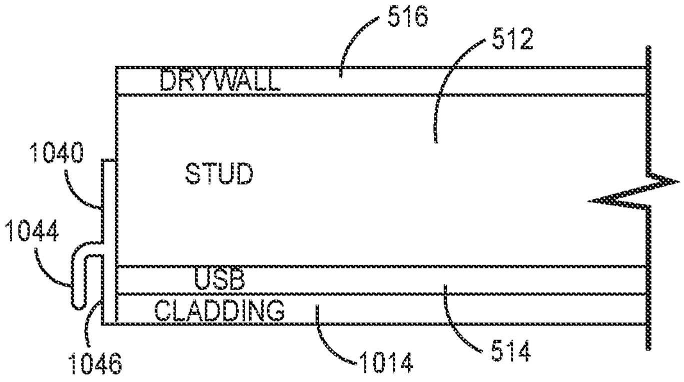
FIG. 6 shows the female portion 1040 in place on an existing wall 600, according to another example embodiment.

FIG. 6 shows the female portion 1040' in place on an existing wall 600, according to another example embodiment. In this embodiment, the L-shaped bracket 1042' is attached to the wall so that one portion abuts the cladding 614 on the exterior surface of the wall. This represents a retrofit application where the cladding on the existing wall is not removed or cannot be removed easily. In this embodiment, the female portion 1040' is attached to the rough opening after the old window has been removed. In one embodiment, the female L-shaped bracket 1040' will have a shortened leg where it abuts the cladding. In another embodiment, the leg for abutting the exterior portion of the wall near the rough opening will be eliminated. It is contemplated that the female portion 1040 may not come as one piece but may be shipped as multiple pieces that need to be attached and formed in the rough opening on site. The retrofit version of the female portion 1040' may have to be made of more flexible material than the version used for new construction, shown in FIGS. 2 and 4.

Figure 7:
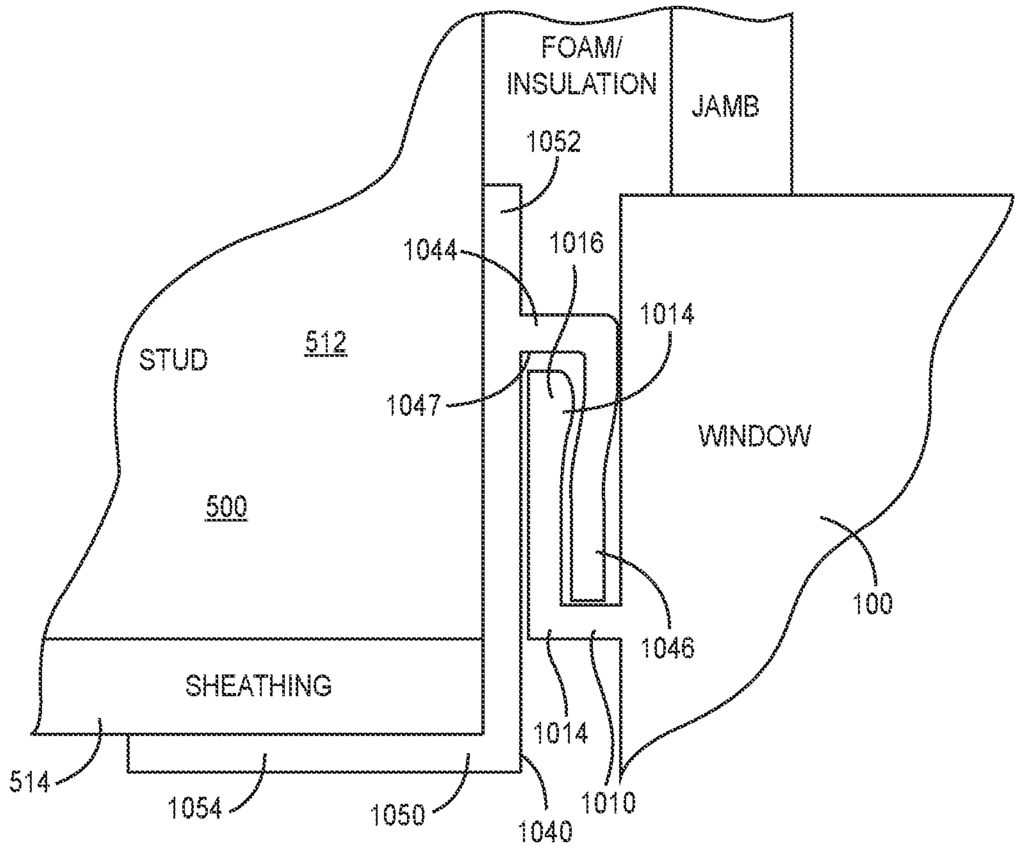
FIG. 7 is a cross-sectional view of the window 100 installed in the rough opening of the wall, according to an example embodiment.

FIG. 7 is a cross-sectional view of the window 100 installed in the rough opening of the wall, according to an example embodiment. The male portion 1010 of the window attachment assembly 1000 is shown engaged with the female portion 1040 of the window attachment assembly 1000. The male portion, as shown in FIG. 7, is attached to one of the outer perimeter of the window 100 frame. The female is attached to the inner perimeter of the opening in the building. The male portion is engaged with the female portion when the window is placed into the opening. The male portion includes an enlarged end. The female portion includes a flexible clip that allows the enlarged end to pass the clip. The female portion is also shaped to have a pocket for receiving the enlarged end of the male portion. In one embodiment, the male portion or female portion attached to the outer perimeter of the window is formed integrally with the window. In one embodiment, a fastener is used to attach the male portion or female portion the outer perimeter of the window. In still another embodiment, the male portion or female portion attached to the outer perimeter of the window is continuous. It forms a continuous channel or male portion that enhances the weatherproof aspect of the installed product. In another embodiment, the other of male portion or female portion attached to the inner perimeter of the opening in the building is continuous.

The other of the male portion or female portion attached to the inner perimeter of the opening includes an L-shaped base, in one embodiment. The L-shaped base having the other of the male portion or female portion is attached to one leg of the L-shaped base. The other leg is formed to abut an exterior surface of the wall having the opening therein. The other leg also acts to properly space the other of the male portion or the female portion. In another embodiment, the other of the male portion or female portion attached to the inner perimeter of the opening includes a substantially straight base. The other of the male portion or female portion attached to the straight base. In yet another embodiment, the other of the male portion or female portion attached to the inner perimeter of the opening is comprised of a plurality of sections. The sections are assembled and attached to the inner perimeter of the window. In still another embodiment, the window includes weather proofing material. The weather proofing material covers the male portion in the state where it is engaged with the female portion. In other words, it is in the space between the window and the rough opening of the wall into which the window is installed. The weather proofing material includes a backer rod and a caulking material.

A window attachment system for attaching a window to an opening in a building includes a male portion and a female portion. One of the male portion and the female portion is attached to one of the outer perimeter of the window frame or the inner perimeter of the opening in the building. The other of the male portion and the female portion is attached to the outer perimeter of the window frame or the inner perimeter of the opening or rough opening 520 in the building. The male portion 1010 is substantially fully engaged with the female portion 1040 when the window 100 is placed or properly set into the opening 520. The male portion 1010 includes an elongated arm 1012 attached to a shoulder portion 1014. The elongated arm 1012 includes an enlarged end 1016. The female portion 1040 includes a flexible clip 1046 that allows the enlarged end 1016 to pass the clip 1046. The female portion 1040 also features a short beam 1044 which attaches the clip 1046 to a base portion 1050. The clip 1046 and the short beam 1044 of the female portion 1040 form a pocket 1047 for receiving the enlarged end 1016 of the male portion. The clip 1046 includes a slight inward bend along the length of the clip 1046 resulting in the pocket 1047 near the short beam 1044. In this embodiment the male portion is formed integrally with the window 100. In another embodiment shown in FIG. 5, a fastener is used to attach the male portion 1010 to the outer perimeter of the window 100. Although a simple cross section view is shown, it is to be understood that the male portion 1010 attached to the outer perimeter of the window 1010 is continuous. The female portion as attached to the inner perimeter of the opening 520 in the building 500 is also continuous. The continuous female portion 1040 forms a continuous channel into which the continuous male portion 1010 fits. The continuous of the female portion 1040 and the male portion 1010 enhances the weatherproof aspect of the installed product.

The female portion 1040 is attached to the inner perimeter of the opening and includes an L-shaped base 1050. The L-shaped base 1050 has a first leg 1052 to which the short beam 1044 and clip 1046 are attached. The other leg or second leg 1054 is formed to abut an exterior surface of the wall 500 having the opening 520 therein. The leg 1054 acts to properly space the the female portion. As shown in FIG. 7 the leg 1054 is abutting the sheathing 514 of the wall 500.

In another embodiment, the female portion 1040 attached to the inner perimeter of the opening 520 includes a substantially straight base. The leg 1054 is eliminated. This base is referred to as the straight base and is shown in FIG. 6. In another embodiment, the male portion 1010 or female portion 1040 are comprised of a plurality of sections. The sections are assembled on site to form a substantially continuous channel. The window is held in place by the clip 1046 and the leg 1014 and attached to the inner perimeter of the window. The window can be separated from the wall or disengaged from the wall using a siding puller. In another embodiment, the male portion 1010 and the female portion 1040 can be switched.

Figure 8:
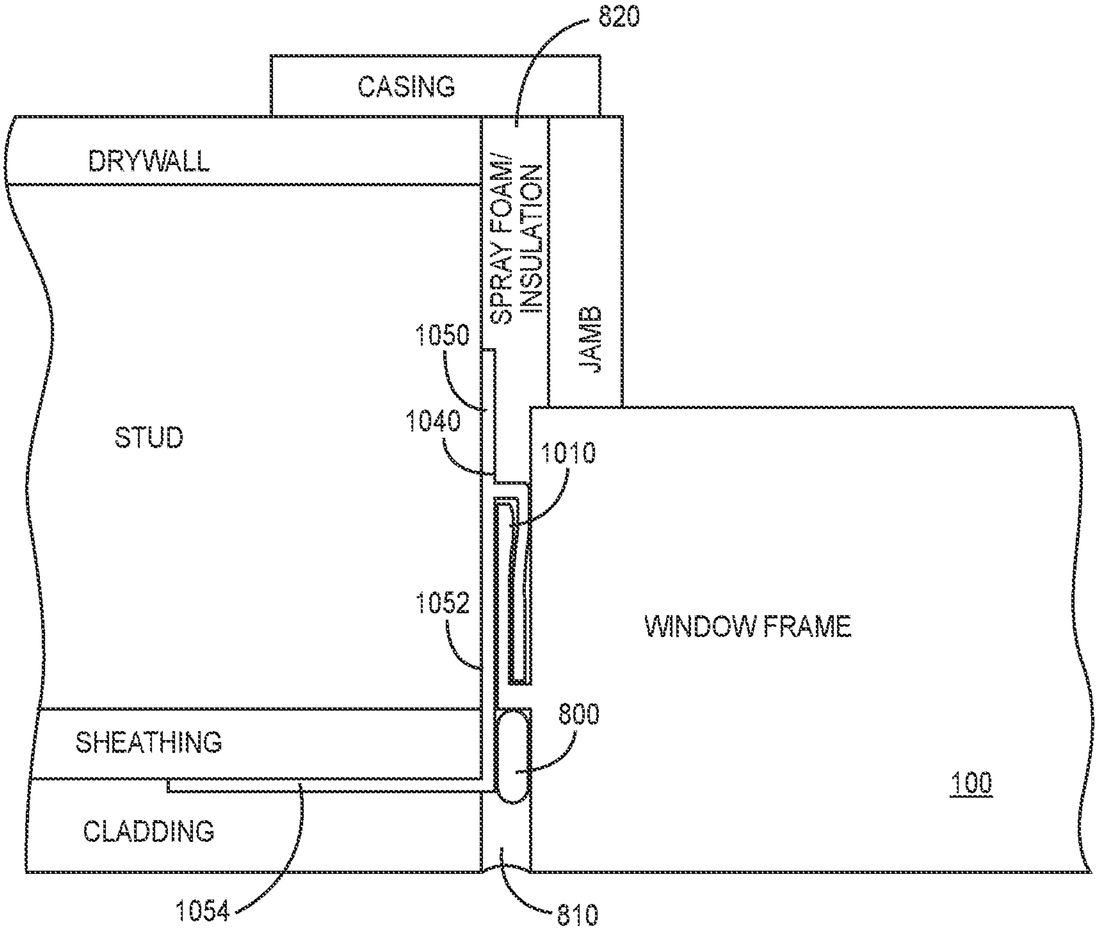
FIG. 8 is a cross-sectional view of the window 100 installed in the rough opening of the wall and weather sealed, according to an example embodiment.

FIG. 8 is a cross-sectional view of the window 100 installed in the rough opening 520 of the wall 500 and weather sealed, according to an example embodiment. When the male portion 1010 is engage with the female portion 1040, a substantially weather tight fit is formed. As shown in FIG. 8 this seal is further enhanced by placing a backer rod 800 into the space between the rough opening 520 in the wall and the window 100 frame. This is further covered by a liberal bead of caulk 810 to further enhance the weather seal. The backer rod 800 and the caulk 810 provide insulative properties as well. As shown in FIG. 8, the back side of the window attachment system is provided with spray foam insulation 820 to further insulate the installed window from the outside elements.

Figure 9:
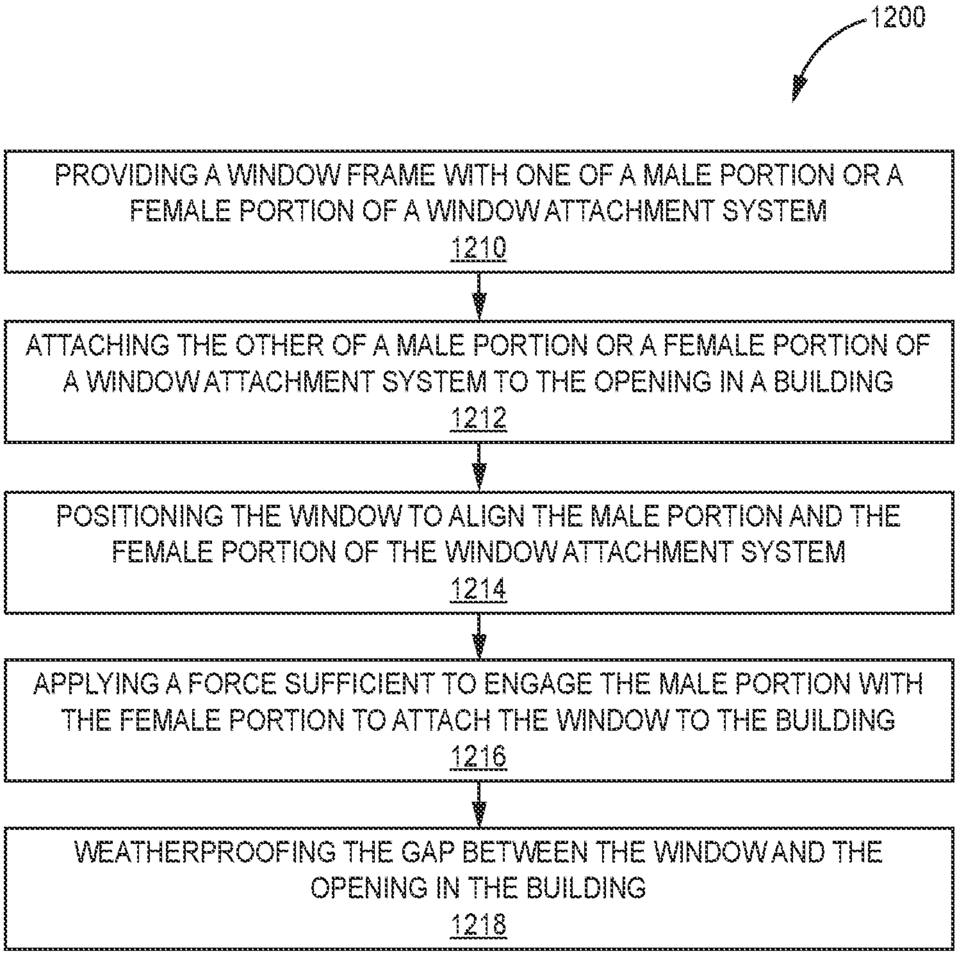
FIG. 9 is a flow diagram of a method for installing a window provided with the male portion and the female portion, according to an example embodiment.

FIG. 9 is a flow diagram of a method 1200 for installing a window provided with the male portion and the female portion, according to an example embodiment. The method 1200 of attaching a window to an opening in a building includes providing a window frame with one of a male portion or a female portion of a window attachment system 1210, and attaching the other of a male portion or a female portion of a window attachment system to the opening in a building 1212. The window is then positioned to align the male portion and the female portion of the window attachment system 1214. A force sufficient to engage the male portion with the female portion is then applied to attach the window to the building. The method 1200 of attaching a window further includes weatherproofing the gap between the window and the opening in the building 1218.

Several embodiments are set forth in the above specification and described drawings. These embodiments include:

A window attachment system for attaching a window to an opening in a building includes a male portion and a female portion. One of the male portion and the female portion is attached to one of the outer perimeter of the window frame or the inner perimeter of the opening in the building. The other of the male portion and the female portion is attached to the outer perimeter of the window frame or the inner perimeter of the opening in the building. The male portion is engaged with the female portion when the window is placed into the opening. The male portion includes an enlarged end. The female portion includes a flexible clip that allows the enlarged end to pass the clip. The female portion is also shaped to have a pocket for receiving the enlarged end of the male portion. In one embodiment, the male portion or female portion attached to the outer perimeter of the window is formed integrally with the window. In one embodiment, a fastener is used to attach the male portion or female portion the outer perimeter of the window. In still another embodiment, the male portion or female portion attached to the outer perimeter of the window is continuous. It forms a continuous channel or male portion that enhances the weatherproof aspect of the installed product. In another embodiment, the other of male portion or female portion attached to the inner perimeter of the opening in the building is continuous.

The other of the male portion or female portion attached to the inner perimeter of the opening includes an L-shaped base, in one embodiment. The L-shaped base having the other of the male portion or female portion is attached to one leg of the L-shaped base. The other leg is formed to abut an exterior surface of the wall having the opening therein. The other leg also acts to properly space the other of the male portion or the female portion. In another embodiment, the other of the male portion or female portion attached to the inner perimeter of the opening includes a substantially straight base. The other of the male portion or female portion attached to the straight base. In yet another embodiment, the other of the male portion or female portion attached to the inner perimeter of the opening is comprised of a plurality of sections. The sections are assembled and attached to the inner perimeter of the window. In still another embodiment, the window includes weather proofing material. The weather proofing material covers the male portion in the state where it is engaged with the female portion. In other words, it is in the space between the window and the rough opening of the wall into which the window is installed. The weather proofing material includes a backer rod and a caulking material.

A window kit includes a window having an outer frame, and one of a male portion or a female portion of an attachment system attached to the frame of the window. The window kit can also include the other of the male portion or the female portion. In one embodiment, the other of the male portion or the female portion is continuous. In another embodiment, the other of the male portion or the female portion is formed of multiple parts. In still a further embodiment, the other of the male portion or the female portion attached to the one of the male portion or the female portion of the window.

A method of attaching a window to an opening in a building includes providing a window frame with one of a male portion or a female portion of a window attachment system, and attaching the other of a male portion or a female portion of a window attachment system to the opening in a building. The window is then positioned to align the male portion and the female portion of the window attachment system. A force sufficient to engage the male portion with the female portion is then aligned to attach the window to the building. The method of attaching a window further includes weatherproofing the gap between the window and the opening in the building.

The various embodiments would provide many advantages, some of which are mentioned here. The advantages include forming a mechanical barrier to water proofing, easier means for installing windows, doors and the like. The method and apparatus would eliminate a lot of waste in window replacement, reduce or eliminate the need for much of the flashing materials used to install windows today, which leads to less cost and more efficient window replacement or placement in new construction. Window placement would be more uniform when the window attachment system is employed. The window could be snapped into place and removed using a common tool such as a siding puller. These and other advantages stem from the above described and shown embodiments.

While the embodiments have been described in terms of several particular embodiments, there are alterations, permutations, and equivalents, which fall within the scope of these general concepts. It should also be noted that there are many alternative ways of implementing the various apparatuses and methods of the present embodiments. It is therefore intended that the following appended claims be interpreted as including all such alterations, permutations, and equivalents as fall within the true spirit and scope of the described embodiments.

What is claimed:

1. A window attachment system for attaching a window assembly to a window opening in a wall of a building that has a window opening surface between an exterior portion of the building and an interior portion of the building, the window attachment system comprising:

a window assembly comprising:

a window frame that surrounds and supports the window system, the window frame further comprising:

a head that forms the main horizontal part of the top of window frame;

a first jamb;

a second jamb, the first and second jambs form the main vertical components that form the sides of the window frame; and a sill that forms the main horizontal part of the bottom of the window frame;

at least one window pane; and a sash that surrounds the at least one window pane to hold the window pane with respect to the window frame, the window frame having an outer perimeter surface which, when the window assembly is positioned in the window opening, is adjacent the window opening surface of the window opening;

a male connector portion attached to one of the outer perimeter surface of the window frame or the window opening surface of the window opening in the exterior wall of the building;

a female connector portion further including a channel which, in cross section has a depth dimension, and a width dimension which is shorter the depth dimension, the female portion attached to the other of the outer perimeter of the window frame or the window opening surface of the window opening in the exterior wall of the building, the width dimension of the channel normal to the outer perimeter surface of the window frame or the window opening surface of the window opening in the exterior wall of the building, the connector male portion slidably engaging the female connector portion as the window assembly is placed into the window opening in the building for the window assembly, the male connector portion disengaged from the female connector portion prior to placing the window assembly into the window opening in the exterior wall of the building.

2. The window attachment system of claim 1 wherein the male connector portion includes an enlarged end.

3. The window attachment system of claim 2 wherein the female connector portion includes a flexible clip that allows the enlarged end to pass the clip, the female connector portion shaped to have a pocket for receiving the enlarged end of the male connector portion.

4. The window attachment system of claim 1 wherein the male connector portion or female connector portion attached to the outer perimeter surface of the window is formed integrally with the window.

5. The window attachment system of claim 1 wherein a fastener is used to attach the male connector portion or female connector portion to the outer perimeter of the window.

6. The window attachment system of claim 1 wherein the male connector portion or female connector portion attached to the outer perimeter surface of the window is continuous.

7. The window attachment system of claim 1 wherein the other of male connector portion or female connector portion attached to the window opening surface of the opening in the building is continuous.

8. The window attachment system of claim 1 wherein the other of the male connector portion or female connector portion attached to the window opening surface of the opening includes an L-shaped base, the L-shaped base having the other of the male connector portion or female connector portion attached to one leg of the L-shaped base, the other leg formed to abut an exterior surface of the wall having the opening therein.

9. The window attachment system of claim 1 wherein the other of the male connector portion or female connector portion attached to the window opening surface of the window opening includes a substantially straight base with the other of the male connector portion or female connector portion attached to the straight base.

10. The window attachment system of claim 1 wherein the other of the male connector portion or female connector portion attached to the window opening surface of the opening is comprised of a plurality of sections, the sections being assembled on the window opening surface of the window.

11. The window attachment system of claim 1 further comprising weather proofing material.

12. The window attachment system of claim 11 wherein the weather proofing material includes a backer rod.

13. The window attachment system of claim 11 wherein the weather proofing material includes a caulking material.

14. A window kit comprising:

a window system comprising:

a window frame that surrounds and supports the window system, the window frame further comprising:

a head that forms the main horizontal part of the top of the window frame;

a first jamb;

a second jamb, the first and second jambs form the main vertical components that form the sides of the frame; and a sill that forms the main horizontal part of the bottom of the window frame;

at least one window pane; and a sash that surrounds and holds the at least one window pane, the sash holding the window pane with respect to the window frame; and one of a male connector portion or a female connector portion of an attachment system attached to the outer perimeter surface of the window frame for the window system, the outer perimeter surface of the window frame substantially perpendicular to the at least one window pane when the at least one window pane is in a closed position and positioned most distant from the at least one window pane, the female connector portion including a channel which, in cross section has a depth dimension and a width dimension which is shorter the depth dimension, the female connector portion attached the outer perimeter of the frame of the window with the width dimension of the channel normal to the outer perimeter surface of the window frame, the male connector portion including a member which, in cross section has a depth dimension and a width dimension which is shorter the depth dimension, the male connector portion attached the outer perimeter surface of the window frame with the width dimension of the member normal to the outer perimeter surface of the window frame.

15. The window kit of claim 14 further comprising the other of the male connector portion or the female connector portion.

16. The window kit of claim 15 wherein the other of the male connector portion or the female connector portion is continuous.

17. The window kit of claim 15 wherein the other of the male connector portion or the female connector portion is formed of multiple parts.

18. The window kit of claim 15 further comprising the other of the male connector portion or the female connector portion attached to the one of the male connector portion or the female connector portion of the window.

19. A method of attaching a window assembly to an opening for the window in a building wherein the window assembly comprises a frame that surrounds and supports the window assembly, the frame further comprising:

a head that forms the main horizontal part of the top of the frame;

a first jamb;

a second jamb, the first and second jambs form the main vertical components that form the sides of the frame; and a sill that forms the main horizontal part of the bottom of the frame;

at least one window pane; and a sash that surrounds and holds the at least one window pane, the sash holding the window pane with respect to the window frame, the method comprising:

attaching one of a male connector portion or a female connector portion of a window attachment system to the outer perimeter surface of the window frame;

attaching the other of a male connector portion or a female connector portion of a window attachment system to the inner portion of the opening for the window in a building;

positioning the window assembly to align the male connector portion and the female connector portion of the window attachment system; and applying a force normal to the surface of the window assembly sufficient to engage the male connector portion with the female connector portion to attach the window assembly to the opening for the window in the building.

20. The method of attaching a window assembly to an opening in a building of claim 19 further comprising weatherproofing the gap between the window assembly and the opening in the building.

* * * * *